US010848321B2

(12) United States Patent
Piel

(10) Patent No.: US 10,848,321 B2
(45) Date of Patent: Nov. 24, 2020

(54) SYSTEMS AND METHODS FOR AUTHENTICATING A USER BASED ON BIOMETRIC AND DEVICE DATA

(71) Applicant: MASTERCARD INTERNATIONAL INCORPORATED, Purchase, NY (US)

(72) Inventor: Brian Piel, Ballwin, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 245 days.

(21) Appl. No.: 15/803,519

(22) Filed: Nov. 3, 2017

(65) Prior Publication Data

US 2019/0140847 A1 May 9, 2019

(51) Int. Cl.
*H04L 29/06* (2006.01)
*H04L 9/32* (2006.01)
(Continued)

(52) U.S. Cl.
CPC ............ *H04L 9/3268* (2013.01); *G06F 21/40* (2013.01); *G06Q 20/322* (2013.01);
(Continued)

(58) Field of Classification Search
CPC .................. G06F 21/40; G06Q 20/322; G06Q 20/40145; G06Q 20/4016; H04L 63/06;
(Continued)

(56) References Cited

U.S. PATENT DOCUMENTS 7,318,048 B1 1/2008 King
7,810,138 B2 10/2010 Vank et al.
(Continued)

FOREIGN PATENT DOCUMENTS

RU 2014138193 A 5/2016

OTHER PUBLICATIONS

Hridya Venugopal et al., A Robust and Secure Authentication Mechanism in Online Banking, 2016, Online International Conference on Green Engineering and Technologies (IC-GET) (Year: 2016).*

(Continued)

*Primary Examiner* — John B King
(74) *Attorney, Agent, or Firm* — Armstrong Teasdale LLP

(57) ABSTRACT

A data controller (DC) system including one or more data controller (DC) computing device for authenticating a user is provided. The DC system is configured to receive first crypto key data associated with a first transaction including encrypted on-device biometric data, and a first account identifier, store the first crypto key data as historical crypto key data, and receive an authentication request message for a second transaction including second crypto key data which includes a second account identifier. The DC system is further configured to correlate the second crypto key data to the historical crypto key data, match the first account identifier to the second account identifier, determine a fraud score for the second transaction, automatically generate an authentication response message including the fraud score, and transmit the authentication response message.

20 Claims, 7 Drawing Sheets

500

505 Receiving a first crypto key data that includes on-encrypted device biometric data, a first device identifier, and a first account identifier 510 Storing the first crypto key data within a database 515 Receiving an authentication request message that includes a second crypto key data including a second device identifier, and a second account identifier 520 Correlating the first crypto key data to the second crypto key data 525 Determining a fraud score for the authentication request message 530 Storing the fraud score within the database as part of the historical data associated with the first crypto key data 535 Building a score table for the first account identifier, wherein the fraud score table includes one or more fraud scores stored within the database 540 Automatically generating an authentication response message in response to the authentication request message 545 Transmitting the authentication response message

(51) Int. Cl.

| | |
|---|---|
| ***H04L 9/08*** | (2006.01) |
| ***G06F 21/40*** | (2013.01) |
| ***G06Q 20/32*** | (2012.01) |
| ***G06Q 20/40*** | (2012.01) |

(52) U.S. Cl.
CPC ... *G06Q 20/4016* (2013.01); *G06Q 20/40145* (2013.01); *H04L 9/0838* (2013.01); *H04L 9/0891* (2013.01); *H04L 63/06* (2013.01); *H04L 63/08* (2013.01)

(58) Field of Classification Search
CPC ..... H04L 63/08; H04L 9/0838; H04L 9/0891; H04L 9/3268
See application file for complete search history.

(56) References Cited

U.S. PATENT DOCUMENTS 8,291,342 B2 10/2012 Hassan et al.
8,572,391 B2 10/2013 Golan et al.
8,613,091 B1 12/2013 Vaidya et al.
8,793,777 B2 7/2014 Colson
2002/0076053 A1 6/2002 Hachimura
2002/0099649 A1* 7/2002 Lee ........................ G06Q 20/04 705/38
2004/0153650 A1* 8/2004 Hillmer ................... G06F 21/64 713/176
2008/0115208 A1 5/2008 Lee
2013/0232073 A1 9/2013 Sheets et al.
2013/0290136 A1* 10/2013 Sheets ................ G06Q 30/0609 705/26.35
2013/0339186 A1* 12/2013 French .................. G06F 21/577 705/26.35
2015/0281218 A1 10/2015 Bowser et al.
2015/0332035 A1 11/2015 Hama et al.
2015/0375324 A1 12/2015 Becker
2016/0042356 A1 2/2016 Gabriel et al.
2016/0094725 A1 3/2016 Dabbiere et al.
2016/0189136 A1* 6/2016 Mercille ............ G06Q 20/3227 705/44
2017/0024733 A1* 1/2017 Purves ................. G06Q 20/322
2017/0124328 A1 5/2017 Krishnapura
2017/0140385 A1* 5/2017 Dobson .............. G06Q 20/4016

OTHER PUBLICATIONS

European Extended Search Report, Application No. 18199661.2, dated Mar. 6, 2019, 8 pps.

* cited by examiner

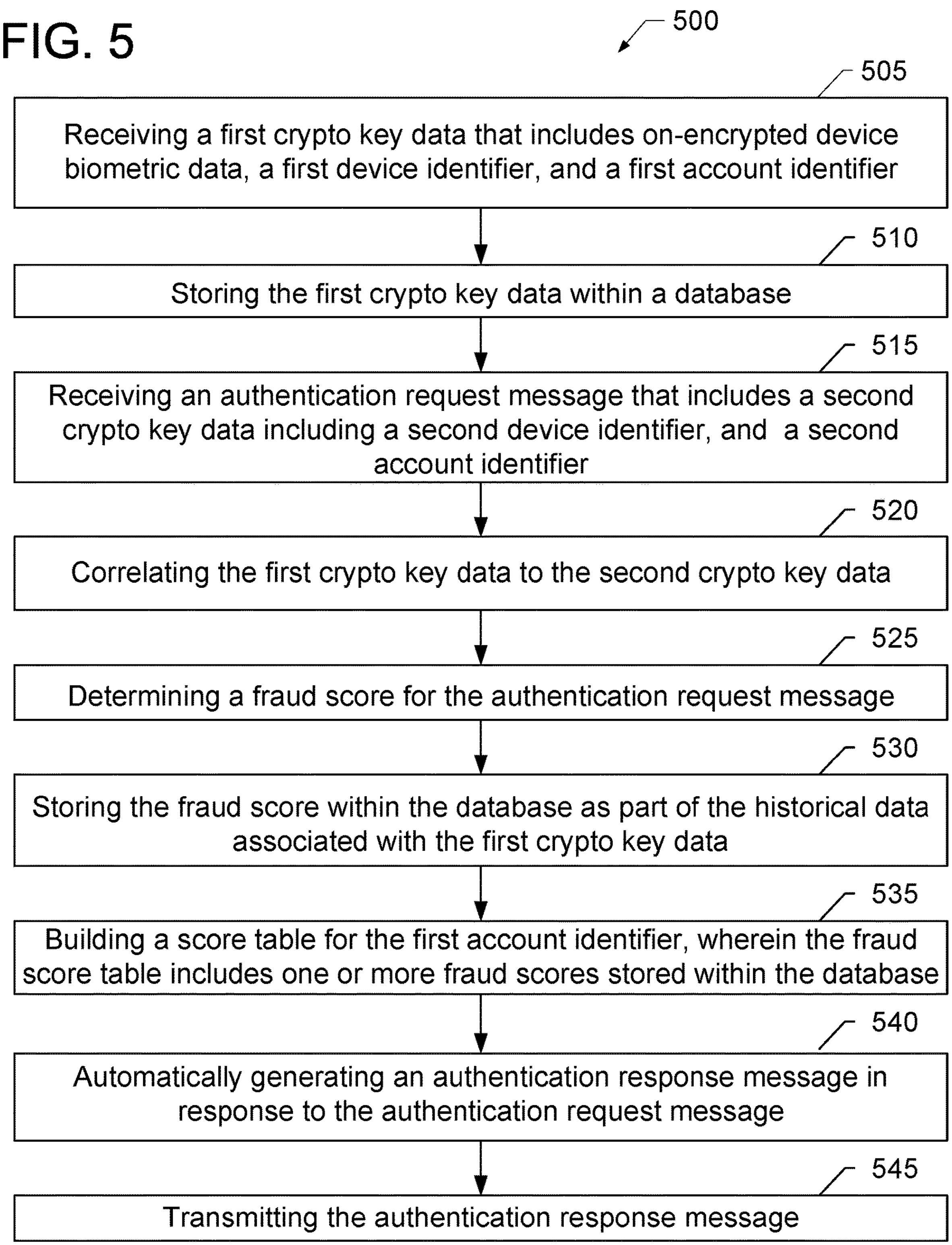
FIG. 5
500
505
Receiving a first crypto key data that includes on-encrypted device biometric data, a first device identifier, and a first account identifier
510
Storing the first crypto key data within a database
515
Receiving an authentication request message that includes a second crypto key data including a second device identifier, and a second account identifier
520
Correlating the first crypto key data to the second crypto key data
525
Determining a fraud score for the authentication request message
530
Storing the fraud score within the database as part of the historical data associated with the first crypto key data
535
Building a score table for the first account identifier, wherein the fraud score table includes one or more fraud scores stored within the database
540
Automatically generating an authentication response message in response to the authentication request message
545
Transmitting the authentication response message

SYSTEMS AND METHODS FOR AUTHENTICATING A USER BASED ON BIOMETRIC AND DEVICE DATA

BACKGROUND

The field of the present disclosure relates generally to networks and, more particularly, to systems and networks for authenticating a user by correlating encrypted on-device biometric data with contextual transactional data and device data associated with the user device.

At least some known payment processing systems involve an exchange of a number of payment card network messages between a merchant, a user or cardholder, an acquirer, and an issuer registered with a multi-party interchange network model. These computer messages may include several transaction attributes, such as, but, not limited to, authorizations, advices, reversals, purchase returns and chargebacks, primary account numbers, transaction amounts, merchant identifiers, acquirer identifiers, transaction date-times, and address verifications.

Some of these known payment processing systems may use edge-based authentication which uses credentials, such as biometric data, that are stored and validated within a user computing device to authenticate a user as the legitimate cardholder. These credentials may be captured using biometric technology, such as fingerprint readers. However, because the validation occurs outside of the payment network (e.g., at the user computing device), the issuer of the payment card may not be able to see the result of the authentications and may be imputed fraud liability on the purchase without directly authenticating the user. Thus, the issuer is not truly assured that it has been provided the user's/cardholder's credentials, and is only reliant on a third-party, such as a merchant, to provide validation of such credentials.

Accordingly, it would be beneficial to have a system that enables parties involved in an online payment transaction, such as an issuer or any party interested in authenticating an online user to confirm that a biometric authentication performed by a user computing device is authentic without requesting the user to provide such biometric data each and every time the user makes a purchase and/or wishes to access user account data.

BRIEF DESCRIPTION

In one aspect, a data controller (DC) system including one or more data controller (DC) computing devices for authenticating a user is provided. The one or more DC computing devices include a processor communicatively coupled to a memory. The DC system is configured to receive first crypto key data associated with a first transaction including encrypted on-device biometric data, a first device identifier, and a first account identifier, store the first crypto key data within a database in communication with the one or more DC computing devices as historical crypto key data, and receive an authentication request message for a second transaction including second crypto key data which includes a second device identifier, and a second account identifier. The DC system is also configured to correlate the second crypto key data to the historical crypto key data. The DC system is further configured to determine a fraud score for the second transaction, wherein the fraud score is determined based upon the crypto key correlation and historical crypto key data associated with the first account identifier, automatically generate an authentication response message in response to the authentication request message including the fraud score, and transmit the authentication response message.

In another aspect, a computer-implemented method for authenticating a user is provided. The method is performed using one or more data controller (DC) computing devices that include at least one processor in communication with at least one memory. The method includes receiving first crypto key data associated with a first transaction including encrypted on-device biometric data, a first device identifier, and a first account identifier storing the first crypto key data within a database in communication with the one or more DC computing devices as historical crypto key data, and receiving an authentication request message for a second transaction including second crypto key data which includes a second device identifier, and a second account identifier. The method also includes correlating the second crypto key data to the historical crypto key data. The method further includes determining a fraud score for the second transaction, wherein the fraud score is determined based upon the crypto key correlation and historical crypto key data associated with the first account identifier, automatically generating an authentication response message in response to the authentication request message including the fraud score, and transmitting the authentication response message.

In yet another aspect, a non-transitory computer readable medium that includes executable instructions for authenticating a user is provided. When the computer executable instructions are executed by one or more data controller (DC) computing devices that include at least one processor in communication with at least one memory device, the computer executable instructions cause the one or more DC computing devices to receive first crypto key data associated with a first transaction including encrypted on-device biometric data, a first device identifier, and a first account identifier, store the first crypto key data within a database in communication with the one or more DC computing devices as historical crypto key data, and receive an authentication request message for a second transaction including second crypto key data which includes a second device identifier, and a second account identifier. The DC system is also configured to correlate the second crypto key data to the historical crypto key data. The DC system is further configured to determine a fraud score for the second transaction, wherein the fraud score is determined based upon the crypto key correlation and historical crypto key data associated with the first account identifier, automatically generate an authentication response message in response to the authentication request message including the fraud score, and transmit the authentication response message.

BRIEF DESCRIPTION OF THE DRAWINGS

FIGS. 1-7 show example embodiments of the methods and systems described herein.

FIG. 1 is a simplified block diagram of a data controller (DC) system that includes one or more DC computing device used for building fraud scores and authenticating a user by correlating encrypted on-device biometric data with contextual transactional data and device data in accordance with one embodiment of the present disclosure.

FIG. 2 is a simplified block diagram of an example data flow using DC system shown in FIG. 1, in accordance with one embodiment of the present disclosure.

FIG. 3 illustrates an example configuration of a user computing device shown in FIG. 2, in accordance with one embodiment of the present disclosure.

FIG. 4 illustrates an example configuration of a server system shown in FIG. 2, in accordance with one embodiment of the present disclosure.

FIG. 5 is a flow chart showing a process for building fraud scores by correlating encrypted on-device biometric data with contextual transactional data and device data using the system shown in FIG. 2.

FIG. 6 is a diagram of components of one or more example computing devices that may be used in the system shown in FIG. 2.

FIG. 7 illustrates an example configuration of a DC computing device, in accordance with one embodiment of the present disclosure.

DETAILED DESCRIPTION

Figure 1:
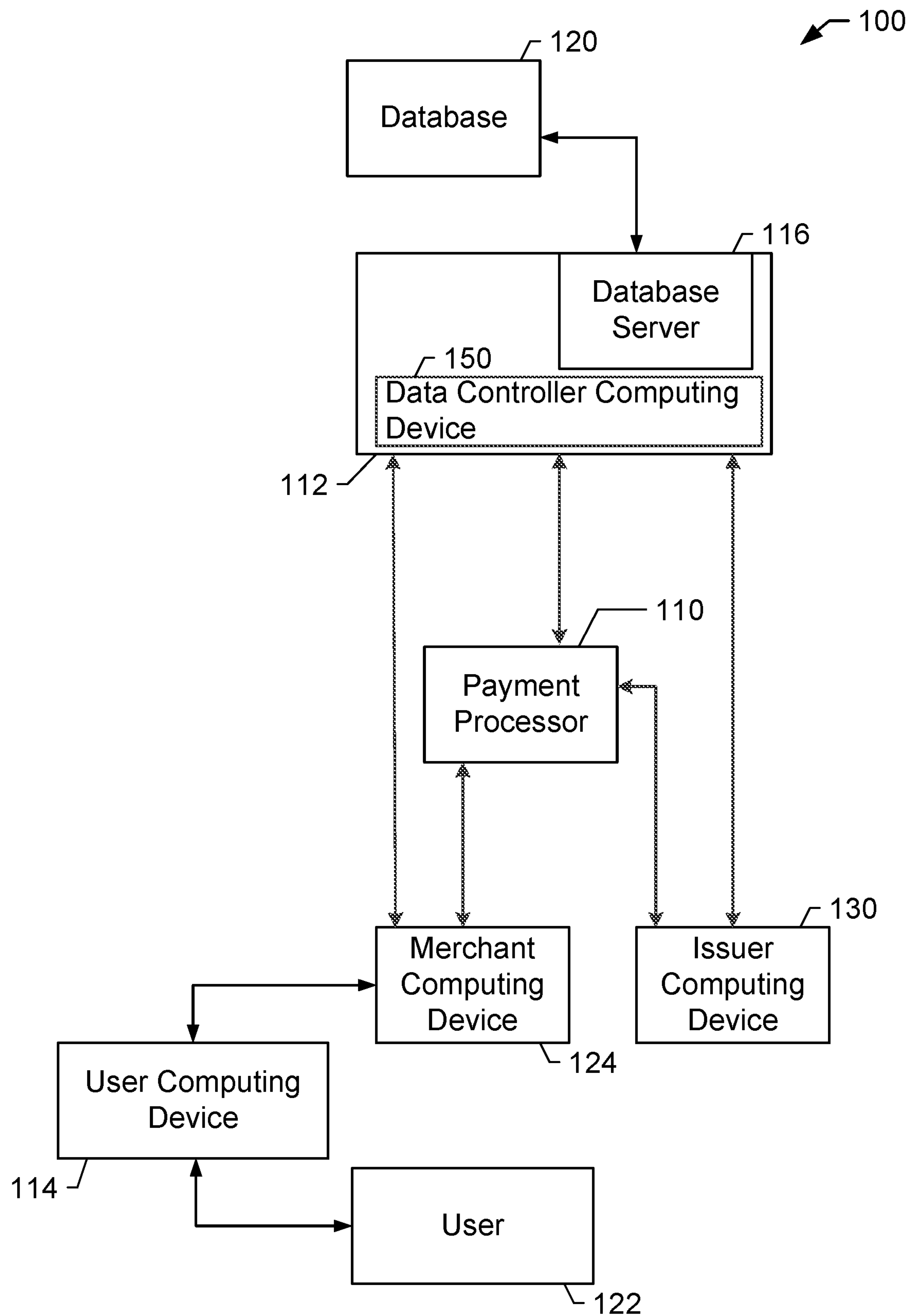

The present disclosure relates to a data controller (DC) system for authenticating a user and, more particularly, an online user by correlating encrypted on-device biometric data with contextual transactional data and device data associated with the user device. In at least some implementations, the DC system includes at least one DC computing device and at least one database. In one embodiment, the database and the DC computing device are components of a server system. The server system may be a server, a network of multiple computer devices, a virtual computing device, or the like. In some embodiments, the DC computing device is in communication with a payment processor computing device. In other embodiments, the DC computing device is integrated into or part of the payment processor computing device. The DC computing device is also in communication with at least one merchant computing device and an issuer computing device. In certain embodiments, the DC computing device is connected to the at least one merchant computing device and the issuer computing device via the payment processor. The DC computing device may also be in communication with a user computing device via an electronic service, such as an electronic application.

The DC system prevents fraudulent payment transactions by correlating encrypted on-device biometric data with contextual transactional data and device data associated with the user device and, more specifically, by building a user account profile using contextual transactional data and crypto key data which may include the encrypted on-device biometric data, the user computing device identifier, and an account identifier (e.g., primary account number (PAN)). The configuration of the DC system enables authenticating the online user in an efficient manner by leveraging technology to solve security-related issues and also ease-of-use issues. For example, the DC system may use edge-based authentication technology, such as a payment gateway, 3-D Secure®, a digital wallet, a controlled payment number, and an online authentication. Each of these technologies may use edge-based authentication which uses credentials, such as biometric data, that are stored, validated, and encrypted within a user computing device.

Even though some known payment processing systems attempt to detect and prevent fraudulent payment transactions by using a fraud measure or prediction, also known as a "fraud score," the detection may be lengthy and may not guarantee the prevention of fraudulent payment transactions. When determining a fraud prediction score, these known systems may use, for example, a user's biometric data that is captured and analyzed at the user computing device. Although the results of the analysis may be provided to the issuer, the issuer may not be confident that the biometric authentication at the user computing device was properly performed. These known fraud detection systems that utilize biometric authentication at the user computing device are sometimes analogized to a scenario where a person receives a telephone call from a merchant who asks the person to send the merchant money on behalf of the person's mother. The scenario goes as follows: the person gets a phone call from the merchant who says, "Hey I need you to send me $5,000. Your mother is standing here in front of me and wants to buy this item. Send me the $5,000." The person replies, "Let me talk to my mom." However, the merchant answers, "No, I already checked her ID. Don't worry about it. She's your mom. Send me the $5000." The person most likely would hang up and not send the money. Similarly, in the known fraud detection systems where the user computing device performs the biometric authentication, an issuer may not approve the transaction. The issuer would prefer to confirm that the user is the authentic user of the account that the merchant is attempting to get funds from and not rely on another party performing the authentication. These systems have many serious limitations. In view of the above, a system, such as the DC system, that does not require multiple parties to confirm the authentication of the user or additional authentication data, such as biometric data, while guaranteeing that the user is authenticated, is needed. Such a system enables parties involved in a transaction to enjoy seamless transaction authentication and authorization processes.

The DC system and, more particularly, the DC computing device is configured to exchange crypto key data as part of a user enrollment process on the electronic service. The DC computing device is also configured to build a fraud score using historical transactional data and rules programmed within the DC computing device. The DC computing device, similarly, is able to store one or more device identifiers (e.g., a user computing device identifier) and one or more account identifiers using encrypted on-device biometric data. Encrypted on-device biometric data is encrypted user biometric data that is generated by the user computing device. User biometric data may include a user's fingerprints, face, voice, iris, or the like. The user computing device may capture the user biometric data by using fingerprint readers, facial recognizers, iris scans, voice prints, or similar detection devices. The DC computing device is able to read the encrypted on-device biometric data while leaving such data encrypted.

The DC computing device is also configured to receive crypto key data (e.g., device identifier, user account identifier) as part of a user enrollment process to the electronic service. Additionally or alternatively, the DC computing device is configured to receive crypto key data included in an authorization request message. The electronic service may include an electronic application, such as a digital wallet, a merchant application, an issuer application, or the like. The user may use the user computing device, such as a smartphone, personal computer, tablet computer, desktop, laptop, or similar computing device to enroll with the electronic service. The user computing device may capture the user biometric data by using fingerprint readers, facial recognizers, iris scans, voice prints, or similar detection devices. The user computing device validates, encrypts, and stores such biometric data, and authorizes the user to access the computing device. When a user enrolls in the electronic service, the DC computing device and the user computing device may exchange crypto key data. In some embodiments, the DC computing device may perform this exchange by using a Fast Identity Online (FIDO) platform. In other embodiments, the DC computing device may use another type of platform.

In some embodiments, crypto key data includes encrypted on-device biometric data, a device, and an account identifier. Additionally or alternatively, the crypto key data includes a token and/or hash value of an account identifier, and/or biometric data. In certain embodiments, the crypto key data is associated with an asymmetric encryption algorithm (e.g., RSA, public-private key encryption), such that the crypto key data is decrypted using a different key than the encrypting key. Additionally or alternatively, the crypto key data may include a digital signature (e.g., public key encryption), such that the crypto key data is associated with a private key. In some embodiments, the crypto key data is encrypted using a combination of asymmetric and symmetric algorithms (e.g., DES, AES). In certain embodiments, the crypto key data may include signing data associated with a certificate authority. For example, the crypto key data may include data encrypted using the private key of a certificate authority.

The DC computing device is configured to receive and store the crypto key data. The DC computing device may store the crypto key data within a database using the user account identifier. In some embodiments, the DC computing device is configured to store received crypto key data as reference crypto key data. For example, the DC computing device may store crypto key data received during an enrollment process as reference crypto key data. Additionally or alternatively, the DC computing device is configured to store a log of crypto key data, including a plurality of instances of crypto key data. For example, the CD computing device may store a log of all instances crypto key data received based on payment card identifiers, such that a record of all crypto key data associated with a payment card identifier is maintained. After the crypto key data is stored, the DC computing device may receive one or more crypto key data for the same account identifier. In some embodiments, the DC computing device may receive crypto key data as part of a transaction process. Thus, the DC computing device may receive crypto key data along with contextual transactional data (e.g., merchant information, stock-keeping unit (SKU) data relating to the goods or services purchased from the user, or the like). The DC computing device is also configured to build a profile for the user account identifier by using the received crypto key data associated with the user account identifier.

In certain embodiments, the DC computing device may receive crypto key data that includes a user computing device identifier that is not associated with the stored crypto key data (e.g., a non-registered user computing device). The DC computing device may add the non-registered user computing device to the user account identifier and enroll such computing device to the electronic service. During the enrollment process, the DC computing device may exchange crypto key data with the user computer device to verify that the computing device is associated with an enrolled user.

In other embodiments, the crypto key data is part of an authentication request message. In this case, a non-registered user computing device may not be added to the user account identifier, and the authentication request message may be declined. In yet other embodiments, the DC computing device may approve an authentication request message when the encrypted on-device biometric data and the user computing device identifier match the stored encrypted on-device biometric data and the stored user computing device identifier.

In yet other embodiments, the DC computing device is configured to determine a fraud score indicating a likelihood of fraudulent transaction for an authentication request message. The DC computing device may determine the fraud score using historical data associated with the user crypto key data, more specifically, the user account identifier. The historical data may include historical fraud scores for such account identifiers. The DC computing device is configured to concatenate historical fraud scores to obtain a single fraud score associated with the account identifier. The DC computing device may use the rules engine to determine whether the fraud score is high or low. For example, if the fraud score for an account identifier associated with the authentication request message is above a predefined score threshold, but the crypto key data associated with an authentication request message is consistent with historical data (e.g., appears in the historical data), the DC computing device may determine that the fraud score for the authentication request message is low, indicating decreased fraudulent transaction risk. Conversely, if the fraud score for the account identifier associated with the authentication request message is low, but the crypto key data associated with an authentication request message is not consistent with the historical data, the DC computing device may determine that the fraud score for the authentication request message is high, indicating elevated fraudulent transaction risk.

In some embodiments, the DC computing device is configured to approve or decline an authentication request message by using the fraud score of the authentication request message and comparing it to a predefined score threshold. The DC computing device may use the rules engine to identify the predefined score threshold. For example, if an authentication request message has a fraud score not within the predefined score threshold, the DC computing device may decline such message if the message does not include encrypted on-device biometric data. In contrast, if an authentication request message has a score within the predefined score threshold, the DC computing device may approve such message even if the message does not include encrypted on-device biometric data.

In some embodiments, the DC computing device is configured to store crypto key data associated with an approved authentication request. In one embodiment, where an authentication request message approved by the DC computing device is associated with received crypto key data inconsistent with historical crypto key data, the DC computing device is configured to store the received crypto key data. For example, a authentication request associated with a new device may be legitimate, but the included crypto data may be inconsistent with the historical crypto key data, and the DC computing device may update and/or expand the stored historical crypto key data to include the crypto key data associated with the new device, such that future authentication requests associated with the new device include crypto data consistent with the historical crypto data.

In certain embodiments, the DC computing device is configured to approve an authentication request message based on the price of a purchase (i.e., transaction amount). For example, if the DC computing device determines the fraud score associated with the user account identifier is high, but the transaction amount is below a predefined value (e.g., $200 U.S.) and the authentication request message includes encrypted on-device biometric data (i.e., crypto key data), the DC computing device may approve the authentication request message based on the crypto key data.

In alternative embodiments, the DC computing device is configured to authorize a payment card transaction if the authentication request message meets a predefined set of rules from the rules engine. In this case, the DC computing may not need to communicate to the issuer computing device prior to authorizing the payment card transaction.

In other embodiments, the DC computing device is configured to store the fraud score for an authentication request message once the DC computing device determines such score. In some embodiments, the DC computing device stores the fraud score, within a database as part of historical data, based on the user account identifier associated with the fraud score. In other embodiments, the DC computing device stores the fraud score, within an in-memory database as part of historical data, based on the user account identifier associated with the fraud score. In the example embodiment, the DC computing device is configured to build a score table by parsing the database, finding one or more fraud scores, and adding such a score to the score table. In certain embodiments, the DC computing device may add the fraud scores to the score table by the user account identifier. In other embodiments, the DC computing device may add the fraud scores to the score table by any other type of identifier stored in the database. In alternative embodiments, the DC computing device may perform the steps performed in the database, as described above, in any other data structure suitable for storing data, such as an in-memory database.

The DC computing device is further configured to receive one or more fraud score requests from one or more requestors. The requestors may be a card issuer, a payment service provider (PSP), a merchant, or any other requestor that may be authorized to receive fraud scores associated with a user account identifier. The DC computing device may transmit a fraud score response in response to the fraud score request. The fraud score response may include the user account identifier, a concatenated fraud score, one or more fraud scores corresponding to one or more authentication request messages (e.g., a fraud score that was determined for an authentication request message), or any other user account data that may be stored in the score table and/or in the database.

In some embodiments, the DC computing device is configured to automatically generate and transmit an authentication response message in response to an approved authentication request message. As explained above, the DC computing device is configured to approve authentication request messages based on different data, such as fraud scores, a purchase price, a device identifier, encrypted on-device biometric data, and crypto key data. Once the DC computing device approves an authentication request message, the DC computing device automatically generates and transmits an authentication response message to the user computing device, merchant computing device, and/or issuer computing device.

The methods and systems described herein may be implemented using computer programming or engineering techniques including computer software, firmware, hardware, or any combination or subset. As disclosed above, at least one technical problem with prior systems is the lack of enhanced fraud detection or inability to confirm a transaction is not fraudulent without the repeated or duplicative input of certain information (such as crypto key data) with each transaction (e.g., without requesting a user to provide biometric information every time the user makes a purchase or executes a transaction). The systems and methods described herein address that technical problem of leveraging crypto key data by using it to build a user account profile and compare the built user account profile to crypto key data received to authenticate a user attempting to make a purchase or execute a transaction. The technical effect of the systems and processes described herein is achieved by performing at least one of the following steps: (a) receive first crypto key data associated with a first transaction including encrypted on-device biometric data, a first device identifier, and a first account identifier; (b) store the first crypto key data within a database in communication with the one or more DC computing devices as historical crypto key data; (c) receive an authentication request message for a second transaction including second crypto key data, the second crypto key data including a second device identifier, and a second account identifier; (d) correlate the second crypto key data to the historical crypto key data; (e) determine a fraud score for the second transaction, wherein the fraud score is determined based upon the crypto key correlation and historical crypto key data associated with the first account identifier; (f) automatically generate an authentication response message in response to the authentication request message, the authentication response message including the fraud score; and (g) transmit the authentication response message.

As used herein, the terms “transaction card,” “financial transaction card,” and “payment card” refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transactions card can be used as a method of payment for performing a transaction.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.).

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a simplified block diagram of an example data controller (DC) system 100, in which a variety of computing devices are communicatively coupled to each other via a plurality of network connections. These network connections may be Internet, LAN/WAN, or other connections capable of transmitting data across computing devices. DC system 100 includes data controller (DC) computing device 150 and database server 116. In one embodiment, DC computing device 150 and database 116 are components of server system 112. Server system 112 may be a server, a network of multiple computer devices, a virtual computing device, or the like. DC computing device 150 may be connected to at least one merchant computing device 124, and an issuer computing device 130 via at least a payment processor 110.

Database server 116 is connected to database 120, which contains information on a variety of matters, as described below in greater detail. In one embodiment, database 120 is stored on server system 112 and can be accessed by potential users of server system 112. In an alternative embodiment, database 120 is stored remotely from server system 112 and may be non-centralized. Database 120 may include a single database having separated sections or partitions or may include multiple databases, each being separate from each other. Database 120 is in communication with DC computing device 150 and may store crypto key data and fraud scores associated with user's 122 account.

In another embodiment, DC computing device 150 is configured to receive contextual transactional data from merchant computing device 124, over payment processor 110. When user 122 performs a transaction at a merchant location, contextual transactional data is generated. Contextual transactional data may be transmitted across computing devices as an authentication request message. In one embodiment, when a user performs a transaction at merchant computing device 124 associated with a merchant, contextual transactional data for the transaction is transmitted to server system 112. Server system 112 processes the contextual transactional data and also transmits it to DC computing device 150.

The contextual transactional data may include transaction amount, a transaction date, account data related to the payment card used to perform the transaction (e.g., PAN associated with payment card, card expiration date, card issuer, card security code, or the like), a merchant identifier, stock-keeping unit (SKU) data relating to the goods or services purchased from the user, or the like. In certain embodiments, the contextual transactional data may also include crypto key data. In other embodiments, DC computing device 150 is configured to receive crypto key data as part of a user enrollment process to an electronic service. The electronic service may include an electronic application, such as a digital wallet, a merchant application, an issuer application, or the like.

In some embodiments, crypto key data includes encrypted on device biometric data, a user computing device 114 identifier, and an account identifier of user 122 (e.g., payment card personal account number (PAN)). Additionally or alternatively, the crypto key data includes a token and/or hash value of an account identifier, and/or biometric data. In certain embodiments, the crypto key data is associated with an asymmetric encryption algorithm (e.g., RSA, public-private key encryption), such that the crypto key data is decrypted using a different key than the encrypting key. Additionally or alternatively, the crypto key data may include a digital signature (e.g., public key encryption), such that the crypto key data is associated with a private key. For example, DC computing device 150 may be configured to determine the identifier of a private key associated with the crypto key data. In some embodiments, the crypto key data is encrypted using a combination of asymmetric and symmetric algorithms (e.g., DES, AES). In certain embodiments, the crypto key data may include signing data associated with a certificate authority. For example, the crypto key data may include data encrypted using the private key of a certificate authority, and the DC computing device 150 may be configured to determine an identifier of the certificate authority.

In some embodiments, DC computing device 150 receives an authentication request message that may include the crypto key data along with contextual transactional data (e.g., merchant information, stock-keeping unit (SKU) data relating to the goods or services purchased from user 122, or the like). DC computing device 150 is also configured to store crypto key data in database 120 based on the account identifier associated with user 122. In some embodiments, database 120 is configured to store asymmetric key information, such as public/private keys, and/or identifiers (e.g., hash values, serial numbers) of public/private keys. DC computing device 150 is further configured to receive one or more authentication request messages that may include crypto key data that may also include an identifier of user computing device 114, and an account identifier of user 122.

DC computing device 150 is also configured to store the crypto key data included in the one or more authentication request messages, and correlate the stored crypto key data to crypto key data included in received authentication request messages. DC computing device 150 may perform a lookup within database 120 using the account identifier of user 122 to correlate the stored crypto key data to the received crypto key data. In one embodiment, DC computing device 150 is configured to determine an identifier (e.g., hash value, serial number) of an asymmetric key associated with the crypto key data, and correlate the identifier to stored crypto key data. Additionally or alternatively, DC computing device 150 is configured to determine an identifier of certificate authority associated with the crypto key data, and correlate the identifier with stored crypto key data. For example, DC computing device 150 may determine the received crypto key data is associated with the same key as stored crypto key data.

In the example embodiment, DC computing device 150 is configured to determine a fraud score for an authentication request message. DC computing device determines such fraud score using the crypto key correlation and historical data associated with account identifier of user 122. DC computing device 150 is further configured to build a score table for user's 122 account. DC computing device 150 builds the score table by parsing historical data for user's 122 account, finding one or more fraud scores for user's 122 account, and adding the one or more fraud score to the score table. The DC computing is also configured to generate a fraud score for user's 122 account by concatenating a plurality of fraud scores stored in the score table associated with user's 122 account. DC computing device 150 is also configured to store the generated fraud score in database 120, and automatically generate an authentication response message in response to the authentication request message. DC computing device 150 may also automatically generate the authentication response message if DC computing device 150 determines that the authentication request message is not fraudulent. DC computing device 150 may determine the authentication request message is not fraudulent by comparing different data to predefined thresholds. DC computing device 150 may use a rules engine to identify the predefined time threshold. Such different data may include fraud scores, crypto key correlation, and/or purchase price. DC computing device 150 may also determine the authentication request message is not fraudulent by comparing the identifier of user computing device 114 and user 122 encrypted on-device biometric data, included in the authentication request message, to the stored computing device of and on-device biometric data associated with user 122.

DC computing device 150 is further configured to transmit the authentication response message to user computing device 114, merchant computing device 124, issuer computing devices 130, and/or any other computing devices authorized to receive the authentication response messages.

In the example embodiment, DC computing device 150 includes specifically designed computer hardware to perform the steps described herein, and includes specifically designed computer implementation instructions. DC computing device 150 is a specially designed and customized computing device built to perform the specific function of building fraud scores by correlating encrypted on-device biometric data with transactional data and device data.

Figure 2:
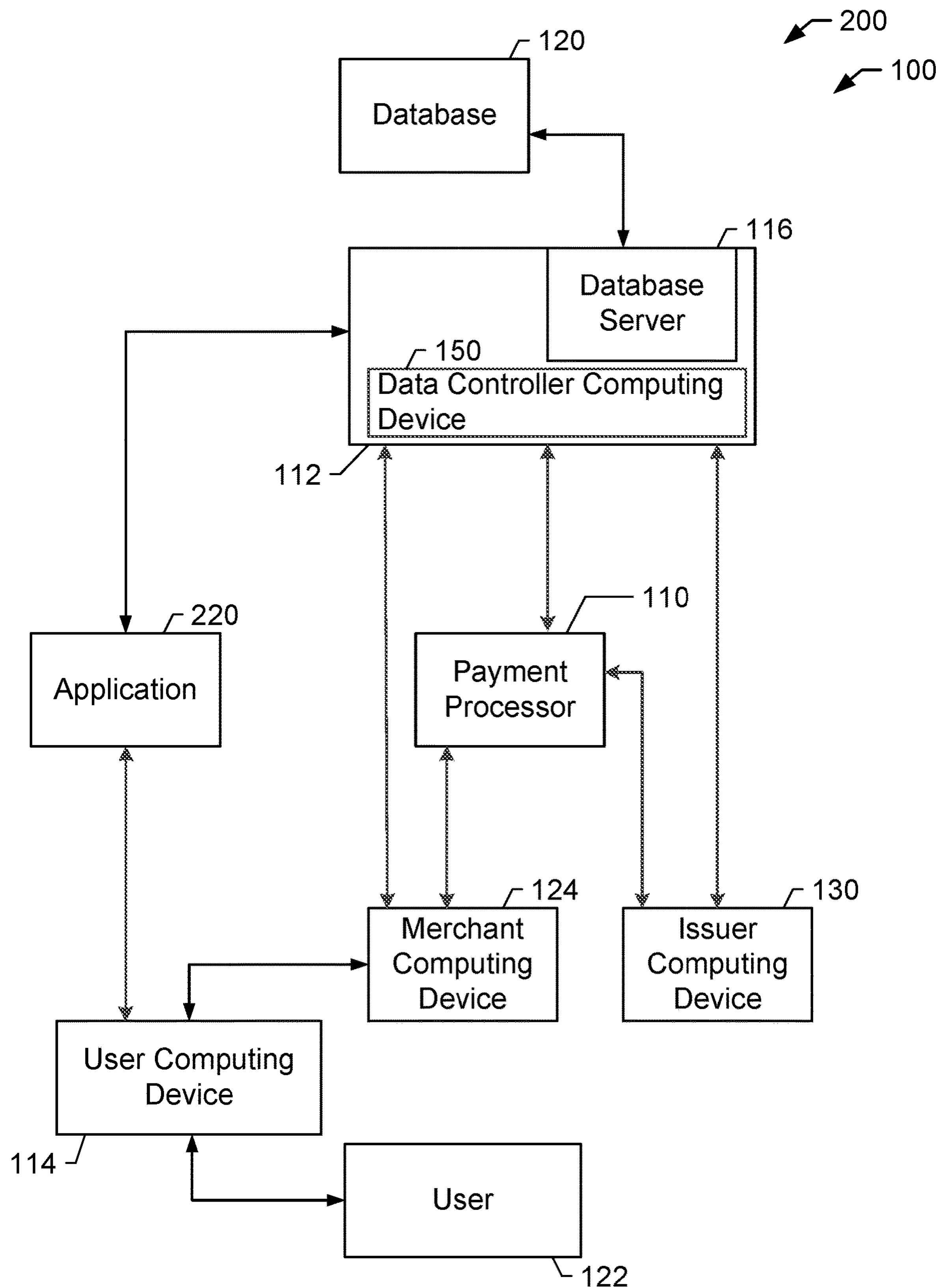

FIG. 2 is a simplified block diagram of an example data flow 200 using data controller (DC) system 100. Embodiments described herein may relate to a transaction card system, such as a credit and/or debit card payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, N.Y.).

In a typical transaction card system, a financial institution called the "issuer" issues a transaction card or electronic payment account identifier, such as a credit card, to a consumer or user 122, who uses the transaction card to tender payment for a purchase from merchant computing device 124, which may be a point-of-sale (POS) terminal. To approve payment with the transaction card, merchant computing device 124 must normally establish an account with a financial institution that is part of the financial payment system. This financial institution is usually called the "merchant bank," the "acquiring bank," or the "acquirer." When user 122 tenders payment for a purchase with a transaction card, merchant computing device 124 requests authorization from a merchant bank for the amount of the purchase. The request may be performed over the telephone, but is usually performed through the use of merchant computing device 124, which reads user's 122 account information from a magnetic stripe, a chip, a two-dimensional code, or embossed characters on the transaction card and communicates electronically with the transaction processing computers of a merchant bank associated with merchant computing device 124. Alternatively, said merchant bank may authorize a third party to perform transaction processing on its behalf. In this case, merchant computing device 124 will be configured to communicate with the third party. Such a third party is usually called a "merchant processor," an "acquiring processor," or a "third party processor."

Using a payment processor 110, computers of merchant bank or merchant processor will communicate with computers of an issuer bank, such as issuer computing device 130, to determine whether user's 122 account is in good standing and whether the purchase is covered by user's 122 available credit line. Based on these determinations, the request for authorization will be declined or approved. If the request is approved, an authorization code is issued to merchant computing device 124.

When a request for authorization is approved, the available credit line of user's 122 account is decreased. Normally, a charge for a payment card transaction is not posted immediately to user's 122 account because bankcard associations, such as Mastercard International Incorporated®, have promulgated rules that do not allow merchant computing device 124 to charge, or "capture," a transaction until goods are shipped or services are delivered. However, with respect to at least some debit card transactions, a charge may be posted at the time of the transaction. When a merchant associated with merchant computing device 124 ships or delivers the goods or services, merchant computing device 124 captures the transaction by, for example, appropriate data entry procedures. This may include bundling of approved transactions daily for standard retail purchases. If user 122 cancels a transaction before it is captured, a "void" is generated. If user 122 returns goods after the transaction has been captured, a "credit" is generated. Payment processor 110 and/or issuer computing device 130 stores the transaction card information, such as a category of merchant, a merchant identifier, a location where the transaction was completed, amount of purchase, date and time of transaction, in a database 120.

For debit card transactions, when a request for a personal identification number (PIN) authorization is approved by the issuer, user's 122 account is decreased. Normally, a charge is posted immediately to user's 122 account. The payment card association then transmits the approval to the acquiring processor for distribution of goods/services or information, or cash in the case of an automated teller machine (ATM)

After a purchase has been made, a clearing process occurs to transfer additional contextual transactional data related to the purchase among the parties to the transaction, such as merchant bank, payment processor 110, and issuer computing device 130. More specifically, during and/or after the clearing process, additional data, such as a time of purchase, a merchant name, a type of merchant, purchase information, user account information, a type of transaction, information regarding the purchased item and/or service, and/or other suitable information, is associated with a transaction and transmitted between parties to the transaction as contextual transactional data, and may be stored by any of the parties to the transaction.

In the example embodiment, the crypto key data is generated by user computing device 114 when user 122 accesses user computing device 114. User computing device 114 transmits the crypto key data to application 220 at the time user 122 logins onto application 220. Subsequently, application 220 routes the crypto key data to DC computing device 150, which stores the crypto key data in database 120. When user 122 makes a purchase the crypto key data is transmitted during the clearance process along with contextual transactional data. When payment processor 110 receives the crypto key data, payment processor 110 routes the crypto key data to DC computing device 150, which compares the received crypto key data to the stored crypto key data. In alternative embodiments, application 220 is in communication with merchant computing device 124 and/or payment processor 110. When user 122 makes a purchase using application 220, application 220 receives crypto key data from user computing device 114 and routes to merchant computing device 114 and/or payment processor 110. In some embodiments, merchant computing device 124 may transmit the crypto key data directly to DC computing device 150. In other embodiments, merchant computing device 124 may transmit the crypto key data to payment processor 110, which then routes the crypto key data to DC computing device 150.

In the example embodiment, DC computing device 150 is configured to receive and store crypto key data, determine a fraud score for an authentication request message, build a score table, automatically generate an authentication response, and transmit such authentication response.

In some embodiments, DC computing device 150 receives an authorization request message from merchant computing device 124. In response to the authorization request message, DC computing device 150 transmits an authorization response to issuer computing device 130 and/or merchant computing device 124. In other embodiments, DC computing device 150 transmits the authorization request message to issuer computing device 130, receives, in response to the authorization request message, an authorization response message from issuer computing device 130, and transmits the authorization response message to merchant computing device 124. In alternative embodiments, DC computing device receives a request for a fraud score for user 122 from a requestor, such as merchant computing device 124 and/or issuer computing device 130. DC computing device 150 retrieves the fraud score for user 122 and transmits the fraud score to the requestor.

Figure 3:
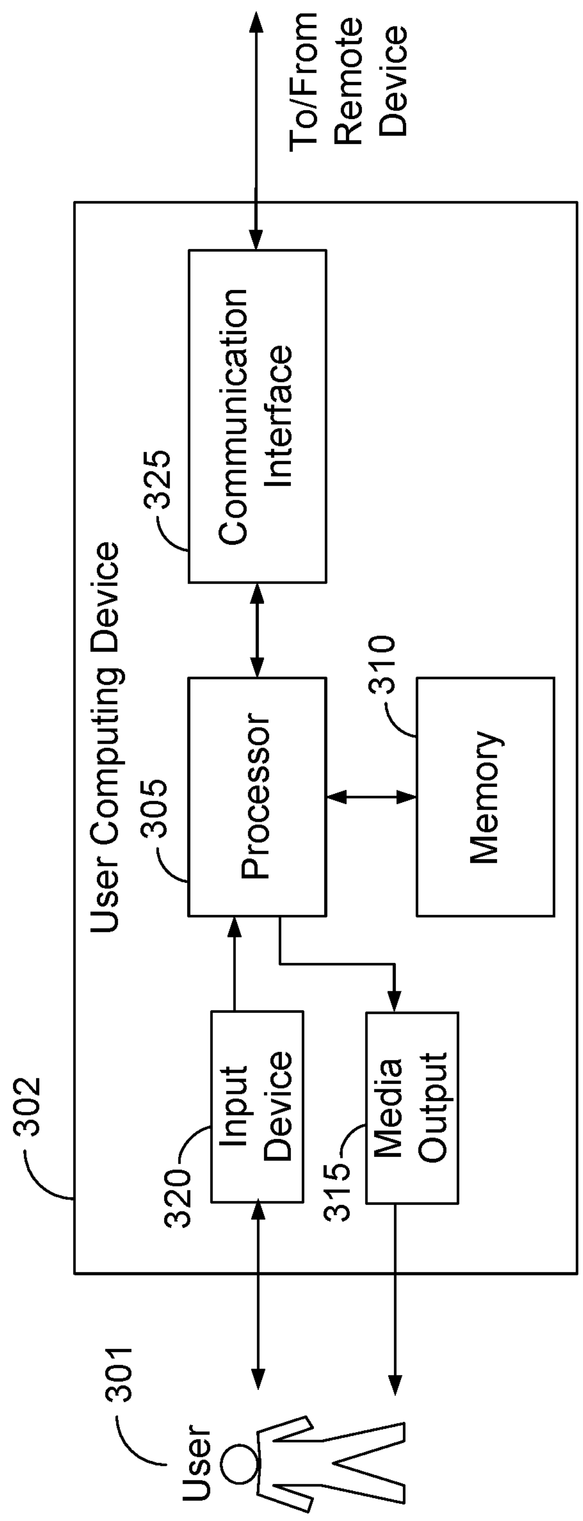

FIG. 3 illustrates an example configuration of a user system 302, such as user computing device 114 (shown in FIG. 1) configured to transmit data to DC computing device 150 (shown in FIG. 1). User system 302 may include, but is not limited to, user computing device 114. In the example embodiment, user system 302 includes a processor 305 for executing instructions. In some embodiments, executable instructions are stored in a memory 310. Processor 305 may include one or more processing units, for example, a multi-core configuration. Memory 310 is any device allowing information such as executable instructions and/or written works to be stored and retrieved. Memory 310 may include one or more computer readable media.

User system 302 also includes at least one media output component 315 for presenting information to user 301. User 301 may include, but is not limited to, user 122 (shown in FIG. 1). Media output component 315 is any component capable of conveying information to user 301. For example, media output component 315 may be a display component configured to display component lifecycle data in the form of reports, dashboards, communications, and the like. In some embodiments, media output component 315 includes an output adapter such as a video adapter and/or an audio adapter. An output adapter is operatively coupled to processor 305 and operatively connectable to an output device, such as a display device, a liquid crystal display (LCD), organic light emitting diode (OLED) display, or "electronic ink" display, or an audio output device, a speaker or headphones.

In some embodiments, user system 302 includes an input device 320 for receiving input from user 301. Input device 320 may include, for example, a keyboard, a pointing device, a mouse, a stylus, a touch sensitive panel, a touch pad, a touch screen, a gyroscope, an accelerometer, a position detector, an audio input device, a fingerprint reader/scanner, a palm print reader/scanner, a iris reader/scanner, a retina reader/scanner, a profile scanner, or the like. A single component, such as a touch screen, may function as both an output device of media output component 315 and input device 320. A single component, such as a touch screen, may function as both an output device of media output component 315 and input device 320. User system 302 may also include a communication interface 325, which is communicatively connectable to a remote device such as server system 112 (shown in FIG. 1). Communication interface 325 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory 310 are, for example, computer readable instructions for providing a user interface to user 301 via media output component 315 and, optionally, receiving and processing input from input device 320. A user interface may include, among other possibilities, a web browser, and client application. Web browsers enable users, such as user 301, to display and interact with media and other information typically embedded on a web page or a website from server system 112. A client application allows user 301 to interact with a server application from server system 112.

Figure 4:
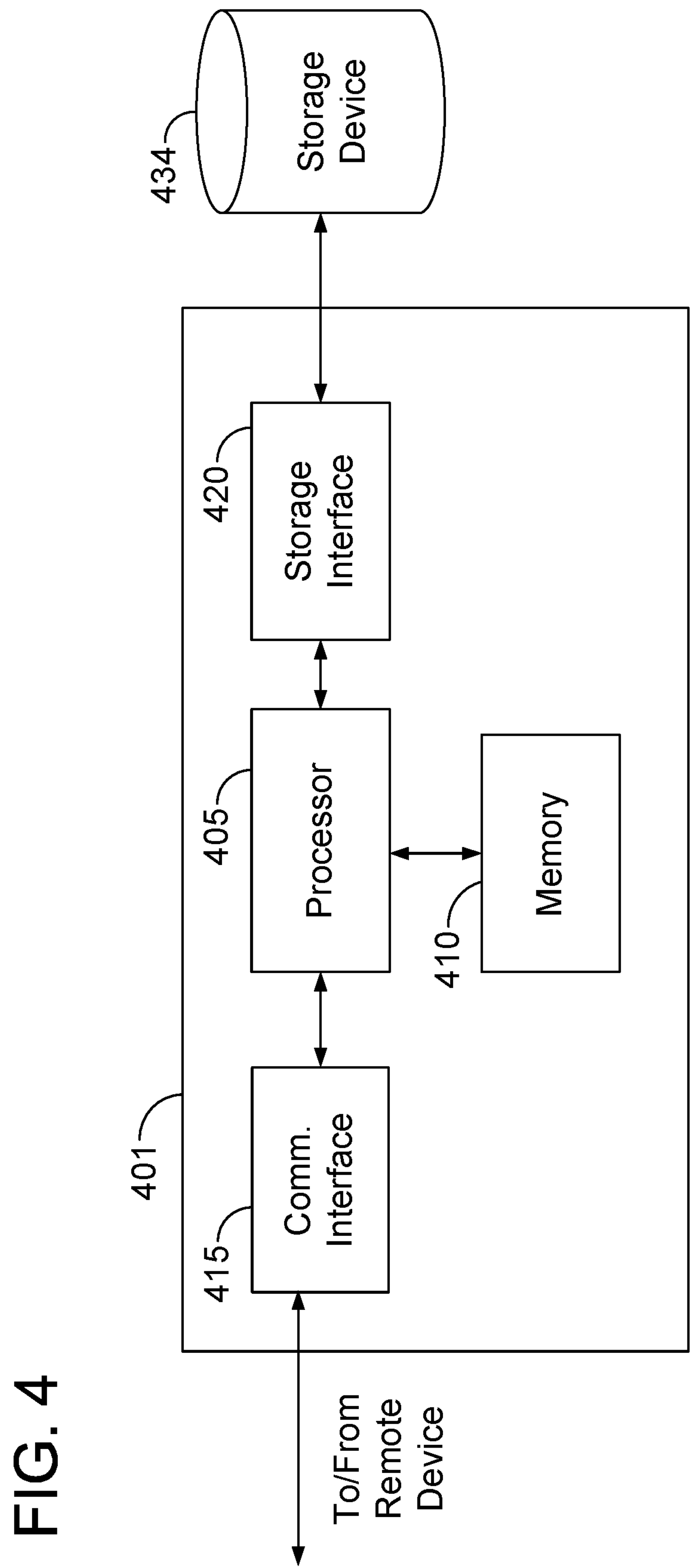

FIG. 4 illustrates an example configuration of a server system 401 such as the server system 112 (shown in FIG. 1) that includes DC computing device 150 (shown in FIG. 1). Server system 401 may include, but is not limited to, database server 116 (shown in FIG. 1) or DC computing device 150. In some embodiments, server system 401 is similar to server system 112.

Server system 401 includes a processor 405 for executing instructions. Instructions may be stored in a memory 410, for example. Processor 405 may include one or more processing units (e.g., in a multi-core configuration) for executing instructions. The instructions may be executed within a variety of different operating systems on the server system 401, such as UNIX, LINUX, Microsoft Windows®, etc. More specifically, the instructions may cause various data manipulations on data stored in storage 434 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 405 is operatively coupled to a communication interface 415 such that server system 401 is capable of communicating with a remote device, such as a user system or another server system 401. For example, communication interface 415 may receive communications from issuer computing device 130 via a plurality of network connections, as illustrated in FIG. 1.

Processor 405 may also be operatively coupled to a storage device 434. Storage device 434 is any computer-operated hardware suitable for storing and/or retrieving data. In some embodiments, storage device 434 is integrated in server system 401. In other embodiments, storage device 434 is external to server system 401 and is similar to database 120 (shown in FIG. 1). For example, server system 401 may include one or more hard disk drives as storage device 434. In other embodiments, storage device 434 is external to server system 401 and may be accessed by a plurality of server systems 401. For example, storage device 434 may include multiple storage units such as hard disks or solid state disks in a redundant array of inexpensive disks (RAID) configuration. Storage device 434 may include a storage area network (SAN) and/or a network attached storage (NAS) system.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Memory 410 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

FIG. 5 is an example flow diagram illustrating a method flow 500 by which at least one DC computing device 150 (shown in FIG. 1) correlates encrypted on-device biometric data with transactional data and device data for authenticating a user (e.g., an online user). Method 500 includes receiving 505 first crypto key data associated with a first transaction including encrypted on-device biometric data, a first device identifier, and a first account identifier, storing 510 the first crypto key data within a database 120 (shown in FIG. 1) as historical crypto key data in communication with the one or more DC computing devices 150, and receiving 515 an authentication request message for a second transaction including second crypto key data, the second crypto key data including a second device identifier, and a second account identifier. Method 500 also includes correlating 520 the second crypto key data to the historical crypto key data. Method 500 further includes determining 525 a fraud score for the second transaction, wherein the fraud score is determined based upon the crypto key correlation and historical crypto key data associated with the first account identifier, automatically generating 540 an authentication response message in response to the authentication request message including the fraud score, and transmitting 545 the authentication response message.

Method 500 may also include storing 530 the fraud score within database 120 as part of the historical data associated with the first crypto key data. Method 500 further includes building 535 a score table that includes one or more fraud scores stored within database 120.

Figure 6:
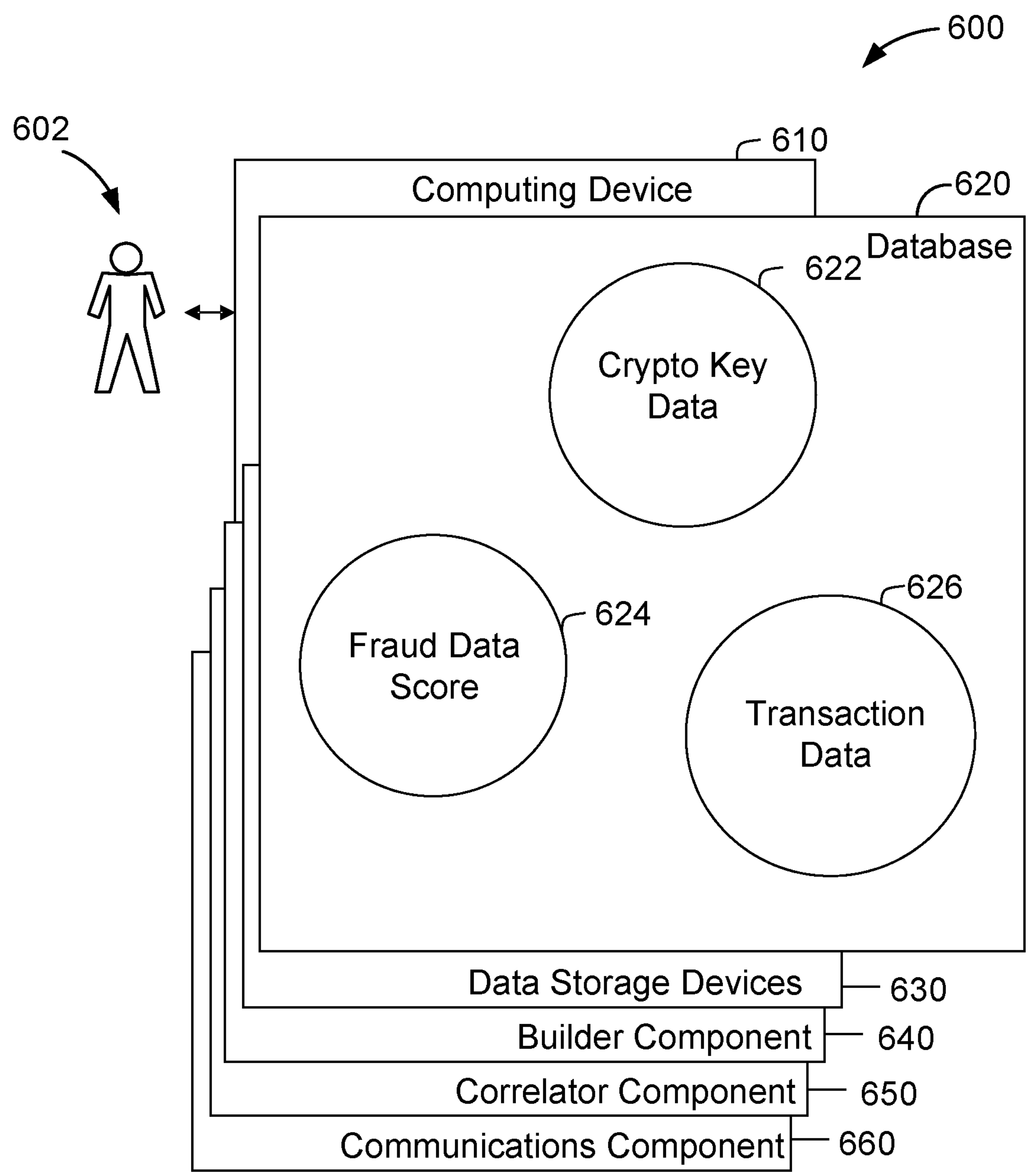

FIG. 6 shows an example configuration of a database 600 within a computing device, along with other related computing components, that may be used to build a fraud score by correlating encrypted on-device biometric data with transactional data and device data associated with user 122 (shown in FIG. 1). In some embodiments, computing device 610 is similar to server system 112 (shown in FIG. 1). User 602 (such as a user operating server system 112) may access computing device 610 in order to verify records in the data table corresponding to user 122. In some embodiments, database 620 is similar to database 120 (shown in FIG. 1). In the example embodiment, database 620 includes crypto key data 622 (e.g., historical crypto key data, reference crypto key data, crypto key log data), fraud score data 624, and contextual transactional data 626. Crypto key data 622 may include user 122 encrypted on-device biometric data, user 122 computing device data (e.g., IP address data, MAC address data), user account data (e.g., PAN), and an authentication request message time stamp (e.g., time the authentication request message was received and/or stored in computing device 610). In some embodiments, database 620 stores reference crypto key data. For example, database 620 may store records including crypto key data and indexed account identifiers, such that crypto key data is rapidly accessible based on an account identifier. Additionally or alternatively, database 620 stores crypto key data including a plurality of instances of crypto key data. For example, database 620 may store a log of all instances crypto key data received based on account identifiers, such that a record of all crypto key data associated with an account card identifier is maintained.

Fraud score data 624 may include historical fraud score data (e.g., historical fraud scores for one or more authentication request messages, historical fraud score values), number of request messages declined and/or approved, and current risk value. Contextual transactional data 626 may include transaction amounts, transaction dates/times, account data related to the payment card used to perform the transaction (e.g., PAN associated with payment card, card expiration date, card issuer, card security code, or the like), merchant identifiers, stock-keeping unit (SKU) data relating to the goods or services purchased by user 122, or the like.

Computing device 610 includes data storage devices 630. Computing device 610 also includes builder component 640 that builds a data table using the fraud scores from authentication request messages corresponding to contextual transactional data associated with user 122. Builder component 640 may also perform, for example, correlating a first crypto key and a second crypto key, determining 525 (shown in FIG. 5) a fraud score for the authentication request message by using a calculated delta and historical data associated with the first crypto key data, and building 535 (shown in FIG. 5) a score table that includes one or more fraud scores stored within database 120.

Computing device 610 also includes correlator component 650 that facilitates correlating data, more specifically, correlating 520 (shown in FIG. 5) the second crypto key data to the historical crypto key data. In one embodiment, correlator 650 may determine if second crypto key data is consistent with historical crypto key data. For example, correlator 650 may determine if second crypto key data is included in and/or suggested by historical crypto key data (e.g., crypto key data 622). In certain embodiments, correlator 650 may correlate crypto key data based on a token and/or has value of an account identifier, and/or biometric data. Additionally or alternatively, correlator 650 may correlate the crypto key data based on an included digital signature (e.g., public key encryption) associated with a certificate authority. For example, correlator 650 may be configured to determine the identifier of a certificate authority associated with the crypto key data. In one embodiment, correlator 650 is configured to correlate second crypto key data to a reference crypto key included in historical crypto key data. For example, correlator 650 may determine an identifier associated with the second crypto key data matches the reference crypto key data. Additionally or alternatively, correlator 650 is configured to correlate second crypto key data to a plurality of instances of crypto key data include in historical crypto key data. For example, correlator 650 may determine an identifier associated with the second crypto key data is consistent with a plurality of identifiers included in the historical crypto key data.

Computing device 610 also includes communications component 660 which is used to communicate with issuer computing devices, merchant computing devices, and/or other computing devices using predefined network protocols such as TCP/IP (Transmission Control Protocol/Internet Protocol) over a plurality of network connections.

In some embodiments, where the second crypto key data is inconsistent with the historical crypto key data, the correlator component 650 is configured to update and/or expand crypto key data 622 to include, at least in part, second crypto key data. For example, crypto key data may be associated with a legitimate transaction, yet the crypto data may be inconsistent with historical crypto key data (e.g., a new device), thus the correlator component 650 may update crypto key data such that future authentication requests associated with the new device include crypto data consistent with the historical crypto data.

Figure 7:
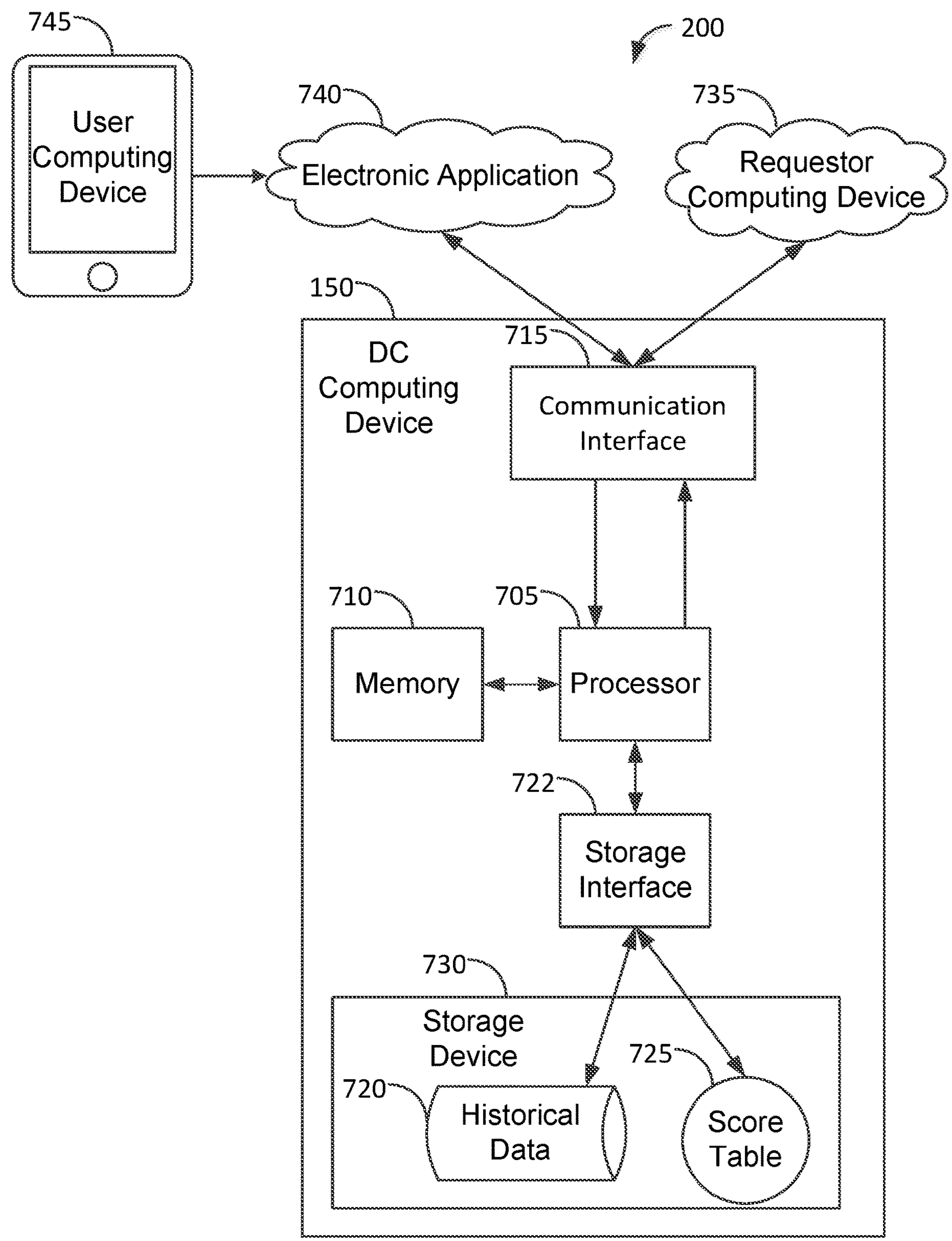

FIG. 7 illustrates an example configuration 700 of a data collector (DC) computing device 150 configured to receive and store crypto key data, determine a fraud score for an authentication request message, build a score table, automatically generate an authentication response, and transmit such authentication response. DC computing device 150 may include, but is not limited to, processor 705 for executing instructions. In some embodiments, processor 705 is similar to processor 405 (shown in FIG. 4). In the example embodiment, DC computing device 150 includes executable instructions stored in a memory 710. The stored executable instructions may be engine rules that may predefine a threshold. Processor 705 may apply such engine rules to data in order to determine whether the data meet a predefined threshold. In some embodiments, memory 710 is similar to memory 410 (shown in FIG. 4). Processor 705 may include one or more processing units, for example, a multi-core configuration. Memory 710 is any device allowing information such as executable instructions and/or written works to be stored and retrieved. Memory 710 may include one or more computer readable media.

DC computing device 150 includes a processor 705 for executing instructions. Instructions may be stored in a memory 710, for example. Processor 705 may include one or more processing units (e.g., in a multi-core configuration) for executing instructions. The instructions may be executed within a variety of different operating systems on DC computing device 150, such as UNIX, LINUX, Microsoft Windows®, etc. More specifically, the instructions may cause various data manipulations on historical data 720 and on score table 725 (e.g., create, read, update, and delete data). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 705 is operatively coupled to a communication interface 715 such that DC computing device 150 is capable of communicating with a remote device, such as payment processor 110 (shown in FIG. 1). In some embodiments, communication interface is similar to communication interface 415 (shown in FIG. 4). In some embodiments communication interface 415 may be a scoring application portal that may receive communications from and transmit communications to one or more requestors computing devices 735 via a plurality of network connections, as illustrated in FIG. 1. Such requestors may request fraud score data associated with a user account identifier and communication interface may transmit a response to such requestors in response to the request. Communication interface 715 may also receive communications from and transmit communications to one or more electronic applications 740, such as a digital wallet, a merchant application, an issuer application, or the like, via the plurality of network connections. These communications may include crypto key data and/or contextual transactional data. In certain embodiments, the one or more electronic applications are also in communication with a user computing device 745 that may be similar to user system 302 (shown in FIG. 3).

Processor 705 may also be operatively coupled to a storage device 730. Storage device 730 is any computer-operated hardware suitable for storing and/or retrieving data. In some embodiments, storage device 730 is integrated in DC computing device 150. In other embodiments, storage device 730 is external to DC computing device 150 and is similar to storage device 434 (shown in FIG. 4). For example, DC computing device 150 may include one or more hard disk drives as storage device 434 (shown in FIG.

4). In other embodiments, storage device 730 is external to DC computing device 150 and may be accessed by a plurality of DC computing devices 150. For example, storage device 730 may include multiple storage units such as hard disks or solid state disks in a redundant array of inexpensive disks (RAID) configuration. Storage device 730 may include a storage area network (SAN) and/or a network attached storage (NAS) system. In the example embodiment, storage device 730 includes historical data 720 and score table 725. In other embodiments, DC computing device may be in communication with multiple storage devices similar to storage device 730. Multiple storage devices may include partial or complete historical data 720 and/or score table 725.

In some embodiments, processor 705 is operatively coupled to storage device 730 via a storage interface 722. Storage interface 722 is any component capable of providing processor 705 with access to storage device 730. Storage interface 722 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 705 with access to storage device 730.

In certain embodiments, processor 705 is configured to instruct DC computing device 150 to receive crypto key data and contextual transactional data through communication interface 715, store crypto key data and contextual transactional data in storage device 730 based on user 122 account identifier, and build score table 725 by using historical data 720 stored in storage device 730. In other embodiments, processor 705 is configured to instruct DC computing device 150 to parse historical data 720 to identify the fraud score of historical authentication request messages associated with an account identifier. In yet other embodiments, processor 705 is configured to instruct DC computing device 150 to determine the fraud score of a current authentication request message and store the determined fraud score in score table 725 based on the user account identifier. In certain embodiments, processor 705 is configured to instruct DC computing device 150 to concatenate one or more fraud scores stored in score table 725 and transmit the concatenated score to one or more requestors 735 using communication interface 715.

In some embodiments, processor 705 is configured to instruct DC computing device 150 to exchange crypto key data with electronic application 740. Processor 705 may instruct DC computing device 150 to decrypt a portion of the crypto key data (e.g., user computing device, user account identifier) in order to identify the account identifier where the crypto key data may be stored. The encrypted on-device biometric data remains encrypted, but it may be assigned an identifier for facilitating correlations with encrypted on-device biometric data associated with the same user account identifier.

In alternative embodiments, processor 705 is configured to instruct DC computing device 150 to approve or decline an authentication request message based on a concatenated fraud score associated with a user account identifier, a score threshold a purchase price included in the authentication request message, and/or crypto key correlation associated with the authentication request message. Processor 705 is further configured to instruct DC computing device 150 to generate and transmit an approved or declined authentication response message in response to the authentication request message. In the example embodiment, the authentication response message is transmitted to electronic application 740. In other embodiments, the authentication response message may be transmitted to any other application, service, or device authorized to receive the authentication response message.

Memory 710 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is to collect digital wallet data from a digital wallet transaction initiated by a user for determining the user's demographics. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A data controller (DC) system comprising one or more data controller (DC) computing devices for authenticating a user, the one or more DC computing devices comprising at least one processor and a memory, the one or more DC computing devices configured to:
receive, as part of a user enrollment process for a digital wallet, first crypto key data including encrypted on-device biometric data, a first device identifier, and a first account identifier;
store the first crypto key data within a database in communication with the one or more DC computing devices as historical crypto key data;
receive an authentication request message for a payment transaction including second crypto key data, the second crypto key data including a second device identifier, and a second account identifier;
correlate the second crypto key data to the historical crypto key data;
determine a fraud score for the second transaction, wherein the fraud score is determined based upon the crypto key correlation;
automatically generate an authentication response message in response to the authentication request message, the authentication response message including the fraud score;
transmit the authentication response message;
receive third crypto key data, the third crypto key data associated with a previously approved authentication request;
determine the third crypto key data is inconsistent with the historical crypto key data from the digital wallet user enrollment process; and
expand the historical crypto key data to include the third crypto key data.

2. The DC system of claim 1, wherein the encrypted on-device biometric data includes on-device biometric data validated by a user computing device.

3. The DC system of claim 1, wherein the first crypto key data is associated with a first user computing device used to complete the digital wallet enrollment process, and wherein the third crypto key data is associated with a second user computing device different from the first user computing device.

4. The DC system of claim 1 further configured to correlate the second crypto key data and the historical crypto key data by at least performing a lookup of the first account identifier in the database and matching the first account identifier to the second account identifier.

5. The DC system of claim 1 further configured to:
store the fraud score within a database as part of the historical data associated with the first crypto key data; and
build a fraud score table for the first account identifier, wherein the fraud score table includes one or more fraud scores stored within the database.

6. The DC system of claim 5 further configured to generate a fraud score associated with the first account identifier by concatenating a plurality of fraud scores stored in the score table.

7. The DC system of claim 6 further configured to transmit the fraud score associated with the first account identifier to a fraud score requestor.

8. The DC system of claim 1 wherein the historical crypto key data includes a plurality of instances of received crypto key data.

9. The DC system of claim 1, wherein the historical crypto key data associated with the first crypto key data includes historical fraud scores.

10. The DC system of claim 1 further configured to automatically generate the authentication response message when the fraud score meets a predefined score threshold.

11. A computer-implemented method for authenticating a user, the method implemented using one or more data controller (DC) computing devices coupled to a memory device, the method comprising:
receiving, as part of a user enrollment process for a digital wallet, first crypto key data including encrypted on-device biometric data, a first device identifier, and a first account identifier;
storing the first crypto key data within a database in communication with the one or more DC computing devices as historical crypto key data;
receiving an authentication request message for a payment transaction including second crypto key data, the second crypto key data including a second device identifier, and a second account identifier;
correlating the second crypto key data to the historical crypto key data;
determining a fraud score for the second transaction, wherein the fraud score is determined based upon the crypto key correlation and historical crypto key data associated with the first account identifier;
automatically generating an authentication response message in response to the authentication request message, the authentication response message including the fraud score;
transmitting the authentication response message;
receiving third crypto key data, the third crypto key data associated with a previously approved authentication request;
determining the third crypto key data is inconsistent with the historical crypto key data from the digital wallet user enrollment process; and
expanding the historical crypto key data to include the third crypto key data.

12. The method of claim 11, wherein the encrypted on-device biometric data includes on-device biometric data validated by a user computing device.

13. The method of claim 11 further comprising building a user account profile by storing the first crypto key data within the database as part of the user enrollment process for the digital wallet, and wherein the user account profile is built by using the first account identifier included in the first crypto key data.

14. The method of claim 11 further comprising correlating the second crypto key data and the historical crypto key data by at least performing a lookup of the first account identifier in the database and matching the first account identifier to the second account identifier.

15. The method of claim 11 further comprising:
storing the fraud score within a database as part of the historical data associated with the first crypto key data; and
building a score table for the first account identifier, wherein the fraud score table includes one or more fraud scores stored within the database.

16. The method of claim 15 further comprising generating a fraud score associated with the first account identifier by concatenating a plurality of fraud scores stored in the score table.

17. The method of claim 16 further comprising transmitting the fraud score associated with the first account identifier to a fraud score requestor.

18. The method of claim 11 wherein the historical crypto key data includes a plurality of instances of received crypto key data.

19. The method of claim 11 further comprising automatically generating the authentication response message when the fraud score meets a predefined score threshold.

20. A non-transitory computer-readable medium that includes computer-executable instructions for authenticating a user, wherein when executed by one or more data controller (DC) computing devices comprising at least one processor in communication with at least one memory device, the computer-executable instructions cause the one or more data controller (DC) computing devices to:

receive, as part of a user enrollment process for a digital wallet, first crypto key data including encrypted on-device biometric data, a first device identifier, and a first account identifier;

store the first crypto key data within a database in communication with the one or more DC computing devices as historical crypto key data;

receive an authentication request message for a payment transaction including second crypto key data, the second crypto key data including a second device identifier, and a second account identifier;

correlate the second crypto key data to the historical crypto key data;

determine a fraud score for the second transaction, wherein the fraud score is determined based upon the crypto key correlation and historical crypto key data associated with the first account identifier;

automatically generate an authentication response message in response to the authentication request message, the authentication response message including the fraud score;

transmit the authentication response message;

receive third crypto key data, the third crypto key data associated with a previously approved authentication request;

determine the third crypto key data is inconsistent with the historical crypto key data from the digital wallet user enrollment process; and expand the historical crypto key data to include the third crypto key data.

* * * * *